US008457624B2

(12) United States Patent
Snow et al.

(10) Patent No.: US 8,457,624 B2
(45) Date of Patent: Jun. 4, 2013

(54) RADIO LINK TIMEOUT PROCEDURE FOR CALL RE-ESTABLISHMENT

(75) Inventors: Christopher Harris Snow, Waterloo (CA); Ayman Ahmed Abdel-Samad, Waterloo (CA); Nazih Almalki, Waterloo (CA); Dinesh Kumar Arora, Waterloo (CA); David Philip Hole, Slough (GB)

(73) Assignee: Research In Motion Limited, Waterloo, Ontario ( * ) Notice: Subject to any disclaimer, the term of this patent is extended or adjusted under 35 U.S.C. 154(b) by 845 days.

(21) Appl. No.: 12/549,890

(22) Filed: Aug. 28, 2009

(65) Prior Publication Data

US 2011/0053586 A1 Mar. 3, 2011

(51) Int. Cl.
*H04W 24/00* (2009.01)
(52) U.S. Cl.
USPC ............... 455/423; 455/67.11; 455/67.13; 455/226.1; 455/226.2; 455/436
(58) Field of Classification Search
USPC ............ 455/422.1, 423, 435.1, 436–438, 455/440, 441, 67.11, 67.13, 226.1, 226.2, 455/226.3
See application file for complete search history.

(56) References Cited

U.S. PATENT DOCUMENTS

| 6,058,302 | A | 5/2000 | Westerberg |
| 7,162,247 | B2 | 1/2007 | Baba et al. |
| 7,489,928 | B2 * | 2/2009 | Smith ................... 455/432.1 |
| 7,852,774 | B2 | 12/2010 | Shen et al. |
| 2002/0193111 | A1 | 12/2002 | Wallstedt et al. |
| 2002/0197992 | A1 | 12/2002 | Nizri et al. |
| 2003/0179731 | A1 | 9/2003 | Noguchi et al. |
| 2006/0068780 | A1 | 3/2006 | Dalsgaard et al. |
| 2006/0209798 | A1 | 9/2006 | Oikarinen et al. |
| 2008/0167042 | A1 * | 7/2008 | Kitazoe ................... 455/436 |
| 2008/0214225 | A1 * | 9/2008 | Choukroun et al. ....... 455/522 |
| 2009/0017824 | A1 * | 1/2009 | Lee et al. ................. 455/437 |
| 2010/0240367 | A1 | 9/2010 | Lee et al. |
| 2011/0080825 | A1 | 4/2011 | Dimou et al. |

FOREIGN PATENT DOCUMENTS

| CA | 2303367 | 3/1999 |
| EP | 1806949 | 7/2007 |
| EP | 1809063 | 7/2007 |

(Continued)

OTHER PUBLICATIONS

3GPP: "Radio Resource Control (RRC); Protocol Specification", 3GPP TS 25.331 V8.4.0, [Online] vol. 25.331, No. v8.4.0, Sep. 1, 2008, pp. 169-170, 284, XP002580001, Retrieved from the Internet: URL: Http://www.3gpp.org/ftp/Specs/html-info/25331.htm [retrieved on Apr. 28, 2010].

(Continued)

*Primary Examiner* — Temica M Beamer
(74) *Attorney, Agent, or Firm* — Hanley, Flight & Zimmerman, LLC (57) ABSTRACT

A radio link timeout procedure for call re-establishment is provided. A mobile station receives signals over a wireless link, determines whether there is a potential call re-establishment as defined by at least one condition, and decides whether radio link failure has occurred on the basis of the signals received over the wireless link such that while there is a potential for call re-establishment as defined by the at least one condition, a decision that a radio link failure has occurred is made earlier than if there is no potential for call re-establishment.

19 Claims, 8 Drawing Sheets

FOREIGN PATENT DOCUMENTS

| | | |
|---|---|---|
| EP | 1809063 A1 | 7/2007 |
| EP | 1909523 | 4/2008 |
| EP | 2056639 A2 | 5/2009 |

OTHER PUBLICATIONS

NTT DoCoMo: "Details of L3 filtering in radio link problem detection", 3GPP Draft; R4-083039, 3rd Generation Partnership Project (3GPP), Mobile Competence Centre; 650, Route Des Lucioles; F-06921 Sophia-Antipolis Cedex, France, no. Prague, Czech Republic; 20081106, Nov. 6, 2008, XP050326240, [retrieved on Nov. 6, 2008].

International Search Report & Written Opinion from International Application No. PCT/IB2010/002081 dated Jan. 26, 2011.

International Search Report & Written Opinion from International Application No. PCT/IB2010/002097 dated Dec. 22, 2010.

Nokia, "Speech Quality & Frame Stealing", GP-012503, 3GPP TSG GERAN #7, Nov. 2001, 7 pages.

3GPP TS 24.008 v8.5.0, Mobile radio interface Layer 3 specification; Core network protocols; Stage 3 (Release 8).

3GPP TS 45.008 v8.2.0, Radio subsystem link control (Release 8).

3GPP TS 44.018 v8.6.0, Mobile radio interface layer 3 specification; Radio Resource Control (RRC) protocol (Release 8).

3GPP TS 44.060 v8.4.0, General Packet Radio Service (GPRS); Mobile Station (MS)—Base Station System (BSS) interface; Radio Link Control/Medium Access Control (RLC/MAC) protocol (Release 8).

Nokia, "Speech Quality & Frame Stealing", GP-012503, 3GPP TSG GERAN #7 (Nov. 2001).

3GPP TSG RAN3#57 bis, R3-071876, (Alcatel-Lucent), Impact of Multiple handover preparations on RAN3 specifications, Sophia Antipolis, France, Oct. 8-11, 2007.

3GPP TS 45.008 version 8.3.0 Release 8, Digital cellular telecommunications system (Phase 2+); Radio subsystem link control, Jun. 2009.

3GPP TS 44.018 version 8.7.0 Release 8, Digital cellular telecommunications system (Phase 2+); Mobile radio interface layer 3 specification; Radio Resource Control (RRC) protocol, Jun. 2009.

International Search Report & Written Opinion from International Application No. PCT/IB2010/002094 dated Jan. 6, 2011.

* cited by examiner

RADIO LINK TIMEOUT PROCEDURE FOR CALL RE-ESTABLISHMENT

FIELD

The application relates to radio link timeout procedures for call re-establishment.

BACKGROUND

In a GSM (Global System for Mobile communications) system, a mobile station (MS) making a voice call tracks a radio link counter, which is used to ensure the quality of the radio link (see 3GPP TS 45.008 Section 5.2). The radio link counter is used to measure the quality on the Slow Associated Control Channel (SACCH) associated with a connection (which may be used to carry a voice call). The SACCH is defined in 3GPP TS 45.002. At the start of a call, after handover, and after re-assignment, the radio link counter "S" is initialized to a network-defined Radio Link Timeout (RLT) value. After every bad SACCH block, S is decreased by 1. After every good SACCH block, S is increased by 2 (to a maximum value of RLT). If the radio channel conditions are bad, many radio blocks will be lost, and eventually the radio link counter will expire when the value of S equals the expiry value (zero). This event is termed Radio Link Failure (RLF), and at that point the device stops using the traffic channel.

The following are some commonly-seen problems leading to radio link failure:

a) Rapid radio channel degradation (e.g., due to sudden co-channel interference, an MS operating near the sensitivity limits, etc). In this case, the network may try to send a handover command to the MS, but the MS will not be able to decode and act on it. Thus, it will be "stuck" in the cell until RLF occurs.

b) The network not sending a handover message in time to avoid RLF. This could be because the handover target cell is too congested to support another call.

c) Uplink interference and/or limit-of-sensitivity (due to limited transmit power) issues. In this case, even if the MS can receive the downlink signalling, the network may not be able to decode the MS transmissions, which will result in the MS being unable to handover successfully (for example, because measurement reports from the MS are not decoded).

In GSM cells that have an enabled call re-establishment (CRE) feature (see, for example, 3GPP TS 24.008 Section 4.5.1.6, 3GPP TS 45.008 Section 6.7.2), there is a method for the MS to recover from RLF. If the mobile station is not able to access any cell which has CRE enabled, RLF results in a call drop.

If the mobile station is able to access one or more cells that have CRE enabled, a MS can use a CRE procedure, that involves finding the best cell (either a new cell, or the current cell) having an enabled call re-establishment feature, by acquiring the relevant system information (SI) messages; sending a message on the Random Access Channel (RACH) requesting a call re-establishment; and then after receiving an immediate assignment, sending a CM (connection management) Re-establishment Request message.

Successful call re-establishment allows the device to re-establish the traffic channel and to continue the call without interruption (the user does not need to manually re-dial the call and wait for the other party to answer).

An existing approach to attempting call re-establishment involves selecting the target cell, then completing an Immediate Assignment procedure. This involves repeating the process of {sending a request; waiting a random time} up to MAX_RETRANS times, and then starting a 5 second timer to ascertain that no response is coming after the last channel request message is sent. (Spacing between Channel Request messages is specified by the algorithm in 44.018 Immediate Assignment Procedure). The same procedure can be started on a subsequent cell, but not before the entire procedure (including all MAX_RETRANS iterations on the first cell, and the 5 second timeout) has been completed in the previous one.

BRIEF DESCRIPTION OF THE DRAWINGS

Embodiments of the invention will now be described with reference to the attached drawings in which.

DETAILED DESCRIPTION

Paragraph 1. A broad aspect of the disclosure provides a method in a mobile station, the method comprising: receiving signals over a wireless link; determining whether there is a potential for call re-establishment as defined by at least one condition; deciding whether radio link failure has occurred on the basis of the signals received over the wireless link such that while there is a potential for call re-establishment as defined by the at least one condition, a decision that a radio link failure has occurred is made earlier than if there is no potential for call re-establishment.

Paragraph 2. Another broad aspect of the disclosure provides the method of paragraph 1 wherein deciding whether radio link failure has occurred on the basis of the signals received over the wireless link comprises: incrementing and decrementing a first counter on the basis of signals received over the wireless link; incrementing and decrementing a second counter on the basis of signals received over the wireless link; wherein incrementing and decrementing the first and second counter is such that the second counter will expire before the first counter.

Paragraph 3. Another broad aspect of the disclosure provides the method of paragraph 1 wherein deciding whether radio link failure has occurred on the basis of the signals received over the wireless link comprises: incrementing and decrementing a counter on the basis of signals received over the wireless link; using a first expiry value for the counter while there is a potential for call re-establishment and using a second expiry value for the counter while there is no potential for call re-establishment.

Paragraph 4. Another broad aspect of the disclosure provides the method of paragraph 2 further comprising initializing the second counter to a value that is a defined offset from an initialization value for the first counter.

Paragraph 5. Another broad aspect of the disclosure provides the method of paragraph 2 further comprising initializing the second counter to a value that is a defined fraction of the initialization value for the first counter.

Paragraph 6. Another broad aspect of the disclosure provides the method of paragraph 2 further comprising setting the second counter to a value that is one of a plurality of values, the one of the plurality of values being selected based on a current value of the first counter.

Paragraph 7. Another broad aspect of the disclosure provides the method of paragraph 2 further comprising initializing the second counter to a value independent of an initialization value for the first counter.

Paragraph 8. Another broad aspect of the disclosure provides the method of paragraph 2 wherein: incrementing and decrementing a first counter on the basis of signals received over the wireless link comprises incrementing and decrementing the first counter as a function of success or failure of receipt of SACCH (Slow Associated Control Channel) blocks; incrementing and decrementing a second counter on the basis of signals received over the wireless link comprises incrementing and decrementing the second counter as a function of success or failure of receipt of SACCH blocks.

Paragraph 9. Another broad aspect of the disclosure provides the method of any one of paragraphs 2 and 4 to 8 further comprising: enabling the second counter only while there is a potential for call re-establishment as defined by the at least one condition.

Paragraph 10. Another broad aspect of the disclosure provides the method of any one of paragraphs 2 and 4 to 8 further comprising: deciding radio link failure has occurred based on the second counter only while there is a potential for call re-establishment as defined by the at least one condition.

Paragraph 11. Another broad aspect of the disclosure provides the method of any one of paragraphs 1 to 10 wherein the at least one condition includes that the mobile station is aware that there is at least one cell that has a call re-establishment feature enabled.

Paragraph 12. Another broad aspect of the disclosure provides the method of any one of paragraphs 1 to 11 wherein the at least one condition includes that the mobile station has a set of cell system information required to perform call re-establishment.

Paragraph 13. Another broad aspect of the disclosure provides the method of any one of paragraphs 1 to 12 wherein the at least one condition includes that voice quality is poor as defined by a metric.

Paragraph 14. Another broad aspect of the disclosure provides the method of any one of paragraphs 1 to 13 further comprising: generating an indication upon deciding that radio link failure has occurred that is the same irrespective of whether there is a potential for call re-establishment.

Paragraph 15. Another broad aspect of the disclosure provides the method of any one of paragraphs 1 to 14 wherein: the determination of radio link failure when the at least one condition is met results in either a call re-establishment attempt or termination of a connection without any call re-establishment attempt.

Paragraph 16. Another broad aspect of the disclosure provides the method of any one of paragraphs 1 to 15 wherein: the determination of radio link failure when the at least one condition is met results in either a call re-establishment attempt, but does not cause termination of a connection without any call re-establishment attempt.

Paragraph 17. Another broad aspect of the disclosure provides the method of any one of paragraphs 1 to 16 further comprising: initiating call re-establishment upon deciding that radio link failure has occurred.

Paragraph 18. Another broad aspect of the disclosure provides a mobile station configured to implement the method of any one of paragraphs 1 to 17.

Paragraph 19. Another broad aspect of the disclosure provides a computer readable medium having computer executable instructions stored thereon which when executed by a mobile station cause the mobile station to execute the method of any one of paragraphs 1 to 17.

A network may only allow for call re-establishment within a short time of RLF. The chances of successful call re-establishment can be enhanced by minimizing the amount of time taken for various steps in the call re-establishment process.

The RLT countdown procedure was described in the Background section above. Typical values for the RLT value are in the range 20 to 48, which, in very poor radio conditions, translates to between roughly 10 to 24 seconds before RLF and the CRE procedure can begin. Theoretically, the RLT value can be from 4 to 64 as per table 10.5.2.3.1 of 3GPP TS 44.018 v8.6.0, "Mobile radio interface layer 3 specification; Radio Resource Control (RRC) protocol (Release 8)", which translates approximately to between 2 and 31 seconds. In many cases, the speech quality during this time will be very poor or non-existent (leading to garbled and silent periods in the audio), often causing the user to manually disconnect the call before the radio link timeout counter timeout occurs.

Embodiments of the application provide methods, mobile devices, networks, and computer readable media that have a shortened RLT period for CRE-enabled devices in networks where CRE is supported. In some implementations, this will improve the perceived audio quality. This is achieved through a mechanism to allow devices supporting CRE to quickly initiate the CRE procedure which in turn may improve the user's perceived voice quality. In addition, since call re-establishment may occur quicker, it is less likely the user will manually disconnect.

Figure 1:
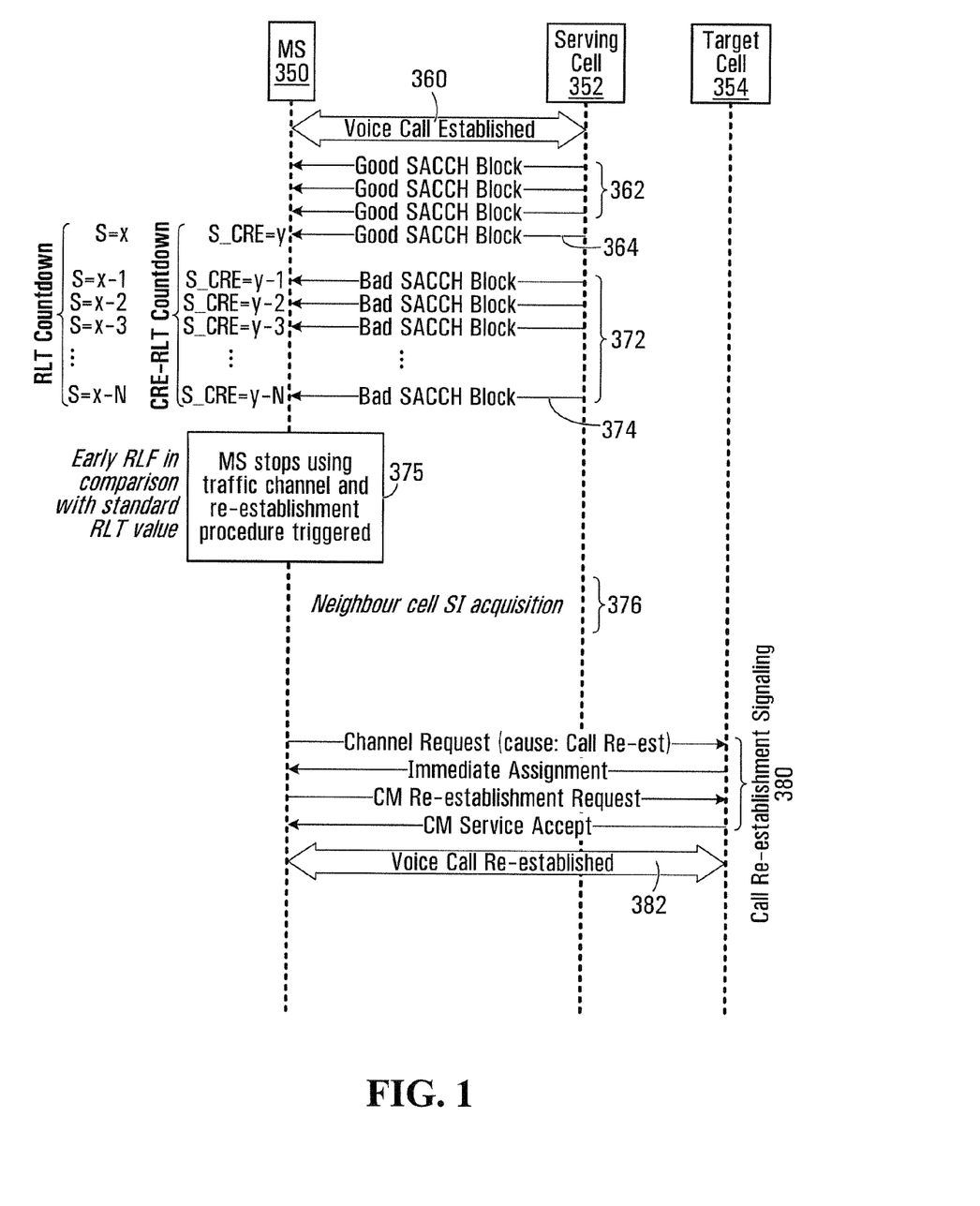
FIG. 1 depicts an example of an interaction between a mobile station, a serving cell and a target cell that results in a comparatively early declaration of radio link failure.

The method will first be described by way of example with reference to FIG. 1. FIG. 1 shows the interaction between a mobile station 350, a serving cell 352 and a target cell 354. At 360, there is an ongoing voice call established between the MS 350 and the serving cell 352 (although the other end of the voice call would typically be elsewhere, not shown). At 362, 364 the serving cell transmits SACCH blocks, typically periodically, which are received as "good SACCH blocks" by the mobile station 350. This is followed by transmission of a series of further SACCH blocks 372,374 which are received as "bad SACCH blocks" by the mobile station 350. Reference to a "cell transmitting" something refers to some network equipment making a transmission, for example a cell controller, such as a base station subsystem (BSS) which might, for example, have base station transceiver (BTS) and base station controller (BSC). The particular sequence of "good" and "bad" blocks is an example only. There may be one, some, many, or even no good SACCH blocks before the "bad" ones start. It is also possible that there are good blocks mixed in with the bad ones. The MS maintains a call re-establishment radio link timeout (CRE_RLT) counter S_CRE which is incremented or decremented based on whether the SACCH blocks are successfully received. The good SACCH blocks referred to above are successfully received blocks, while the bad SACCH blocks referred to above are the unsuccessfully received SACCH blocks. Specifically, in the illustrated example, S_CRE is assumed to be some value "y" upon receipt of good SAACH block 364, and to decrease to the point where S_CRE is y−N after bad SACCH block 374. In some embodiments, the CRE_RLT counter may, for example, be incremented and decremented as follows:

successful SACCH block: increment S_CRE by 2
unsuccessful SACCH block: decrement S_CRE by 1

In addition, the MS maintains a radio link timeout counter S which is incremented or decremented based on whether the SACCH blocks are successfully received. Specifically, in the illustrated example, S is assumed to be some value "x" upon receipt of good SAACH block 364, and to decrease to the point where S=x−N after bad SACCH block 374, where x−N>0, so RLF is not yet triggered by the RLT counter. The RLT counter may, for example, be incremented and decremented as follows:

successful SACCH block: increment S by 2
unsuccessful SACCH block: decrement S by 1

It is assumed that S_CRE=y−N leads to expiry of the CRE_RLT counter and a conclusion of RLF that is reached early compared to when this conclusion would have been reached based on RLT countdown. Detailed examples of how the CRE_RLT counters operate and timeout are given below.

After block 374, expiry of the CRE_RLT, the mobile station stops using the traffic channel as indicated at 375, and the re-establishment procedure is also triggered. Call re-establishment signalling is performed as indicated at 380. In the specific example depicted, this includes: the MS 350 transmitting a Channel Request (cause: Call Re-establishment); the target cell 354 responding with an Immediate Assignment; the MS 350 transmitting a CM Re-establishment Request; the target cell 354 transmitting a CM Service Accept. Later, as indicated at 382, the voice call is re-established. There may be additional, or completely different steps.

In some embodiments, a timeout value for the CRE_RLT counter is transmitted to the mobile station by the network. This might, for example be done by each cell as part of broadcast information transmitted by the cell. In a specific example, the parameter may be added to a system information message transmitted by a cell. For example, the parameter may be broadcast on the BCCH, and would be known to the MS before the start of the call. Alternatively, the parameter may be sent on the SACCH and would be sent during the call. Alternatively, the CRE_RLT value may be coded into the mobile stations during device configuration, for example in a factory where the device is made.

Four examples for specifying a CRE_RLT value include:
1. Specify a fixed value for the CRE_RLT value;
2. Specify the CRE_RLT value as a fixed fraction of the default BCCH/SACCH RLT values; or
3. Specify the CRE_RLT value as a fixed offset from the default BCCH/SACCH RLT values.
4. Specify a plurality of possible CRE_RLT values, and select a particular one based on a current value of the RLT counter; for example each possible value could be associated with a range of the RLT counters.

In practice, the CRE_RLT value should be set to result in expiry prior to RLT expiry. For example, if an RLT value of 20 is used, a CRE_RLT value of 8 or 10 might be used.

In some embodiments, CRE_RLT is conditionally used by the mobile station when certain conditions are met. At least one condition is defined which must be satisfied before the mobile station will start to use the CRE_RLT counter and/or before the mobile station will declare a radio link failure based on the CRE_RLT counter.

The following are some example conditions.

In a first example, the at least one condition includes a condition that the MS be aware that CRE is supported in at least one cell (for example by reading the appropriate SI messages). This could be the serving cell and/or one or more neighbour cells.

In a second example, the at least one condition includes a condition that the MS has a set of system information required to perform CRE (e.g., RACH parameters).

In a third example, the at least one condition includes a condition that the voice quality is poor, for example as defined by some metric. An example of a metric is a number of bad speech frames. Another example is residual bit error rate. Other metrics that may not necessarily be reflective of voice quality may alternatively, or additionally be used. An example is signal-to-noise ratio.

In some embodiments, the at least one condition includes a combination of any two or more of the conditions set out in the first, second and third examples above.

In some embodiments, rather than using two counters, a single counter is used but with two expiry values. For example, when at least one condition is satisfied, instead of waiting for an expiry of the radio link counter S based on the RLT expiry value, currently 0, to trigger RLF, the MS expires S based on a second expiry value that is greater than zero. In these embodiments, when the at least one condition becomes satisfied, the MS may expire S immediately if it is equal to or below the second expiry value.

The examples described thus far assume one or two counters that count down towards expiry value(s). Corresponding implementations are possible where one or more counters count up towards expiry value(s). In yet another alternative, a counter for normal RLT expirations could count down towards expiration, and a counter for CRE_RLT could count up towards expiration. In yet another alternative, a counter for normal RLT expirations could count up towards expiration, and a counter for CRE_RLT could count down towards expiration.

This procedure allows devices to more quickly initiate the CRE procedure on a neighbour cell, which in turn improves the user's perceived voice quality and minimizes garbling and silent gaps on the radio link due to bad radio conditions.

In some embodiments, the CRE_RLT counter S_CRE is incremented and decremented based on the success or failure of SACCH blocks as in the illustrated example, but other criteria can be used. In some embodiments, S_CRE is initialised to a different CRE_RLT value than the initialization value RLT for the RLT counter S.

Figure 2:
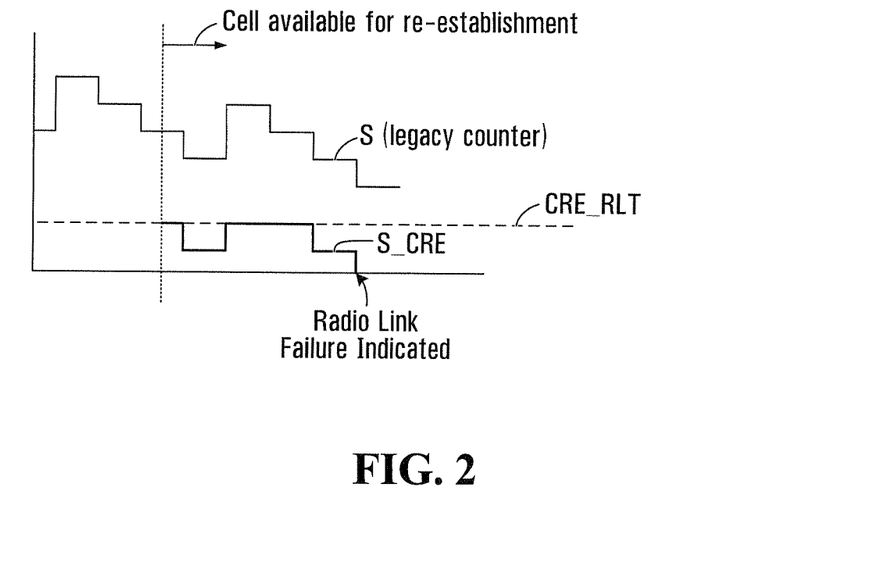
FIG. 2 depicts example trajectories for a legacy counter and a second counter that expires sooner than the legacy counter.

In some embodiments, S_CRE may be activated and de-activated during a call, for example depending on whether or not the mobile station is aware of a cell which supports re-establishment. An example of this behaviour is depicted in FIG. 2. When S_CRE is activated following deactivation, its value may be adjusted to reflect recent activity. This may trigger immediate expiry of the CRE_RLT counter S_CRE if, at the point of activation, the value of S_CRE is lower than [assumes counting down] its expiry value.

Furthermore, S_CRE may be initialized to a CRE_RLT value each time S is initialized (not shown). S is initialized at call start, and subsequently re-initialized after every handover or re-assignment.

Figure 3:
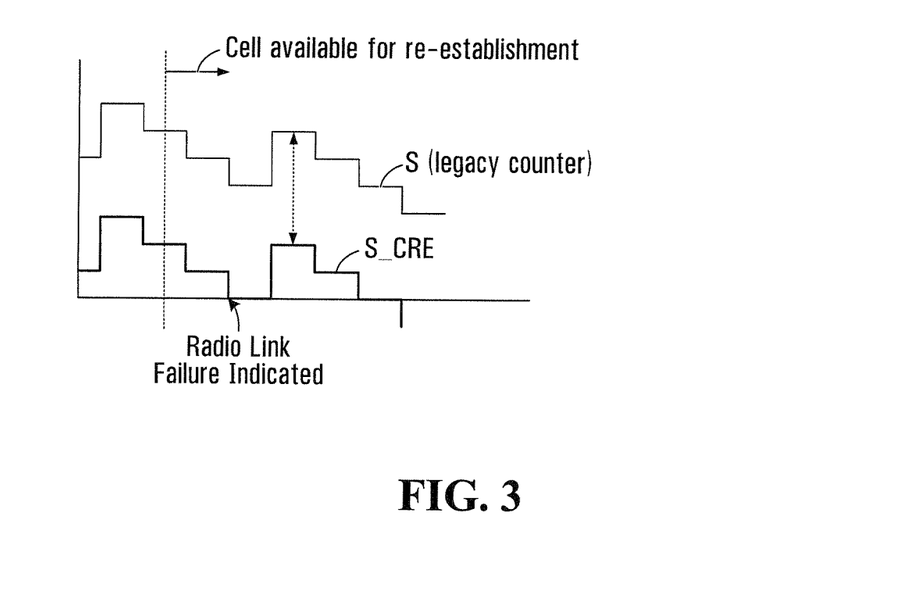
FIG. 3 is another example of trajectories of a legacy counter and another counter that expires earlier than the legacy counter.

In some embodiments, S_CRE is initialized to a value offset from the initialization value for S at the same time as the initialization of S and is updated continuously in the same manner as updates to S, tracking S by a fixed offset independent of whether the mobile station is aware of a CRE target cell. A radio link failure will be triggered if S_CRE is equal to or lower than 0 and the mobile station is aware of a CRE target cell. An example of this behaviour is depicted in FIG. 3.

Figure 4:
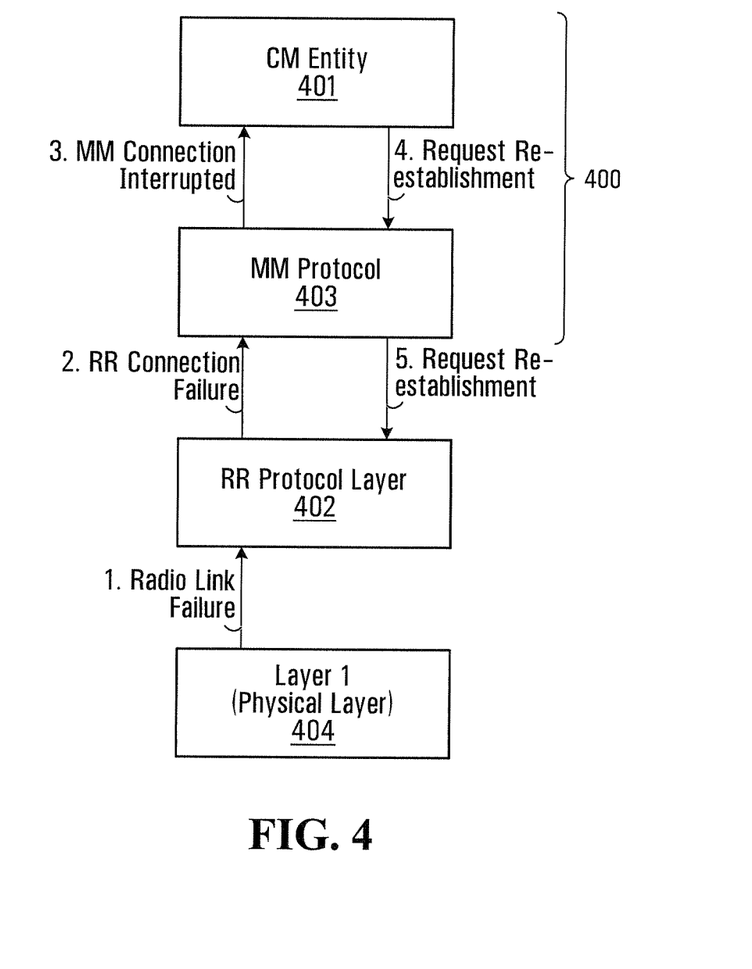
FIG. 4 shows an example of a protocol stack of different layers of a protocol stack that may be involved with call re-establishment.

FIG. 4 shows an example of different layers in a protocol stack that may be involved with call re-establishment. These include upper layers 400 which may for example include an MM (Mobility Management) sublayer 403 and a CM (Connection Management) sublayer 401, RR (radio resource) protocol layer 402, and layer 1 (physical layer) 404. The main function of the Mobility Management sublayer is to support the mobility of user terminals, such as informing the network of its present location and providing user identity confidentiality. A further function of the MM sublayer is to provide connection management services to the different entities of the upper Connection Management (CM) sublayer. Connection Management (CM) sublayer functions may, for example include functions for the control, provision, and support of services offered by the network. This might for example include functions to establish, maintain and terminate circuit-switched connections across a GSM PLMM and other networks to which the GSM PLMN is connected. The RR protocol layer 402 provides Radio Resource management procedures that may, for example, include the functions related to the management of the common transmission resources, e.g. the physical channels and the data link connections on control channels. The general purpose of Radio Resource procedures is to establish, maintain and release RR connections that allow a point-to-point dialogue between the network and a mobile station. This includes the cell selections/reselection and the handover procedures. Moreover, Radio Resource management procedures include the reception of the uni-directional BCCH and CCCH when no RR connection is established. This permits automatic cell selection/reselection.

In some embodiments, the S_CRE CRE_RLT countdown occurs at layer 1 404 to detect a radio link timeout and RLT countdown occurs at the same time at layer 1 404. In some embodiments, after being informed of radio link failure by layer 1 404, the RR protocol layer 402 informs the MM protocol 403 of an RR connection failure, and the MM protocol 403 in turn informs the CM entity 401 that the MM connection has been interrupted. The CM entity 401 makes a decision about whether to trigger re-establishment or not. In some cases (mainly where there is no active voice call ongoing if the call is in the call establishment or call clearing phase, i.e. any state other than the "active" state or the "mobile originating modify" state), call re-establishment may not be triggered. In a specific example, no re-establishment is triggered if the call is in the call establishment or call clearing phase, i.e. any state other than the "active" state or the "mobile originating modify" state.

Figure 5:
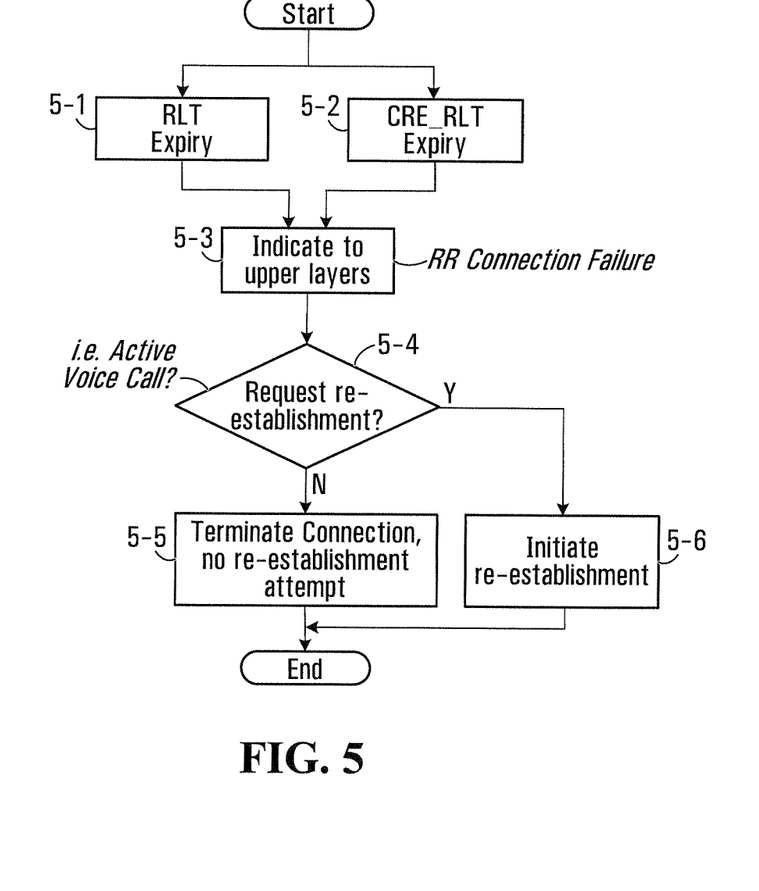
FIG. 5 is a flowchart of a first method of initiating call re-establishment.

In some embodiments, the determination of RLF when the at least one condition is met results in either a call re-establishment attempt or termination of the connection without any call re-establishment attempt. In some embodiments, no re-establishment attempt is made if the MS has no ongoing call or if all ongoing calls are in the call establishment or call clearing phase, i.e. any state other than the "active" state or the "mobile originating modify" state (see 3GPP TS 24.008 v.8.5.0). An example is depicted in FIG. 5.

In some embodiments, an indication sent to upper layers as a result of CRE_RLT counter expiry is not distinct from an indication that is sent due to normal RLT counter timeout. An example of this type of behaviour is depicted in FIG. 5. When RLT counter expiry occurs at 5-1, an indication (for example of RR connection failure) is sent to upper layers at 5-3. Similarly, when CRE_RLT counter timeout occurs at 5-2, an indication (for example of RR connection failure) is sent to upper layers at 5-3 which is not distinct from the indication sent due to RLT counter expiry. In the illustrated example, the upper layers then make a decision as to whether or not to request call re-establishment at 5-4. In the event the decision is no, for example if there is no voice call, then at 5-5 the connection is terminated and no call re-establishment is attempted. In the event the decision is yes, then at 5-6 call re-establishment is initiated.

In some embodiments, the determination of RLF when the at least one condition is met results in either a call re-establishment attempt if, for example, the MS has one or more calls in the "active" state or the "mobile originating modify" state (see 3GPP TS 24.008 v.8.5.0), but does not cause termination of the connection without any call re-establishment attempt.

Figure 6:
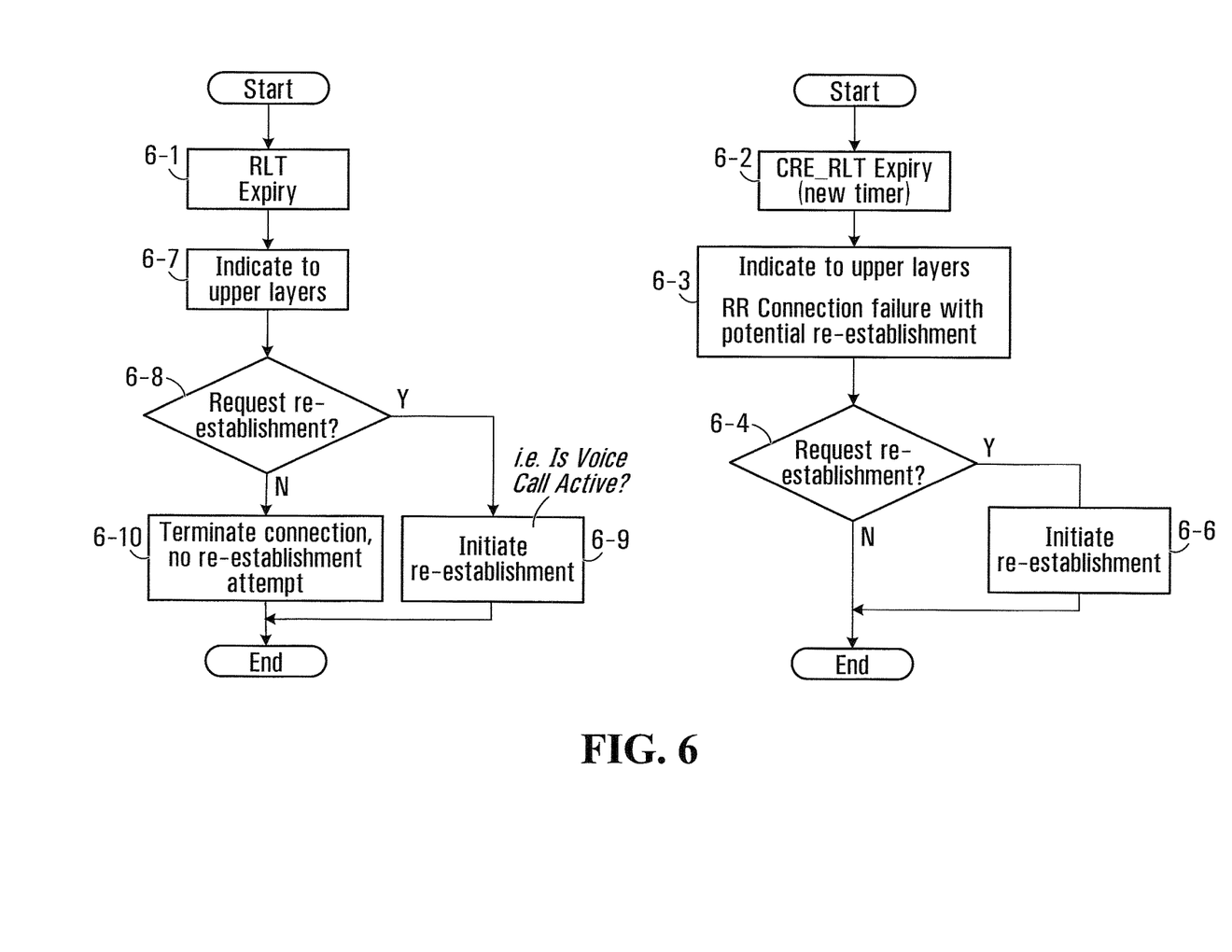
FIG. 6 contains flowcharts of a second method of initiating call re-establishment.

In some embodiments, an indication sent to upper layers as a result of CRE_RLT counter expiry that is distinct from an indication that is sent due to RLT counter expiry. An example of this type of behaviour is depicted in FIG. 6. When RLT counter expiry occurs at 6-1, RLT counter expiry behaviour occurs. In the illustrated example, this consists of the sending of an indication (for example of RR connection failure) to upper layers at 6-7. The upper layers then make a decision as to whether or not to request call re-establishment at 6-8. In the event the decision is no, for example if there is no voice call, then at 6-10 the connection is terminated and no call re-establishment is attempted. In the event the decision is yes, then at 6-9 call re-establishment is initiated. On the other hand, when CRE_RLT counter expiry occurs at 6-2, an indication (for example of RR connection failure) is sent to upper layers at 6-3 which is distinct from the indication sent due to RLT counter expiry. In the illustrated example, this is referred to as "RR connection failure with potential re-establishment". The upper layers then make a decision as to whether or not to request call re-establishment at 6-4. In the event the decision is no, for example if there is no voice call, then the method ends. If no early CRE is to occur, eventually a regular RLT expiry 6-1 may occur eventually leading to termination of the call in block 6-10. In the event the decision is yes in block 6-4, then at 6-6 call re-establishment is initiated.

Recall that in some embodiments, CRE_RLT is conditionally used by the mobile station when certain conditions are met. At least one condition is defined which must be satisfied before the mobile station will start to use the CRE_RLT counter and/or before the mobile station will declare a radio link failure based on the CRE_RLT counter. A set of specific examples was given previously. Where a distinct indication is used, passing the distinct indication to the upper layers is an indicator of satisfaction of the conditions that must be satisfied for the indication to be passed. For example, the distinct indication may be sent to the upper layers upon expiry of the S_CRE counter only if there is the potential for call re-establishment. Since it is a distinct indication, in this case, transmission of the indication will be an indication that from the layer 1 perspective, there is the potential for call re-establishment, and the upper layers can make use of this information. The upper layers can make use of this by initiating the re-establishment.

Figure 8:
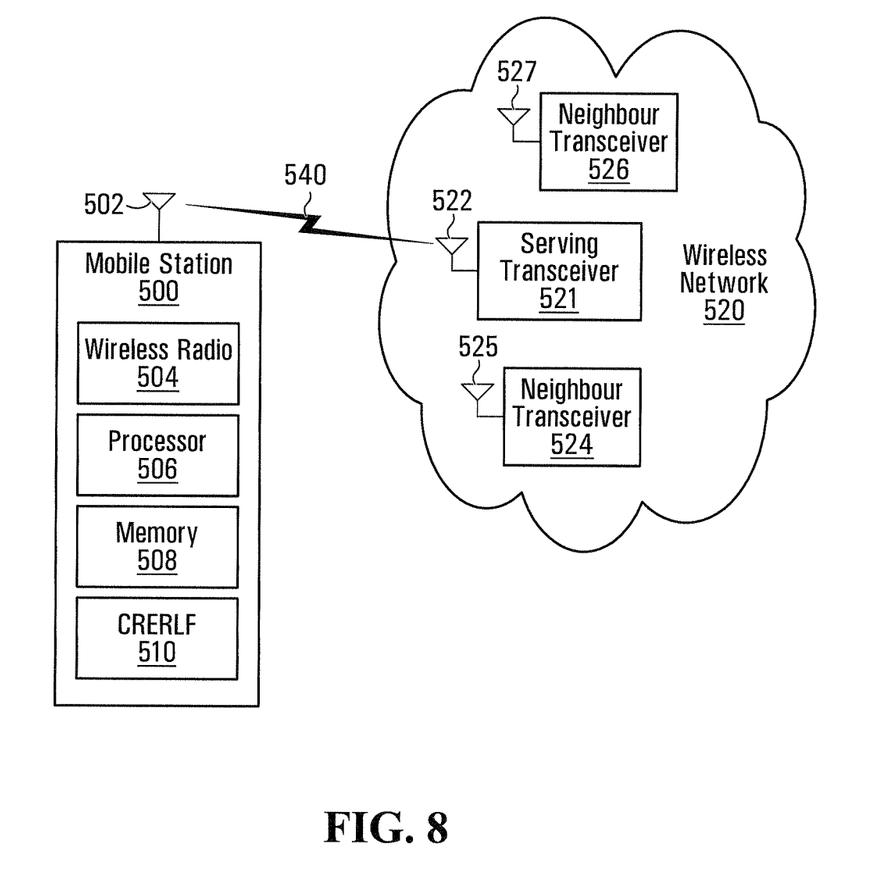
FIG. 8 is a block diagram of a communication system including a mobile station and a network.

Referring to FIG. 8, shown is a block diagram showing a mobile station 500 and a network providing wireless communication services. The mobile station 500 has at least one antenna 502, a processor 506, wireless radio 504 and device memory 508 which may include non-volatile RAM, ROM and or volatile RAM. The mobile station is shown with a single wireless radio 504, but in some embodiments, the mobile station may have multiple such wireless radios, for example if the mobile station is a multi-mode mobile station. The mobile station 500 has a CRERLF (call re-establishment with early radio link failure) module 510. Of course, the mobile station may have additional components to those shown, and the components shown may be arranged/combined/implemented differently than shown.

The network 520 is shown to include a serving transceiver 521 having at least one antenna 522. At the instant depicted, the mobile station 500 is obtaining wireless communications services via transceiver 521. Also shown are two neighbour transceivers 524,526 with associated antennas 525,527. Transceivers 521,524,526 may, for example be part of respective base stations.

It is to be understood that the network 520 would have any appropriate components suitable for a network providing wireless communications services. Note that the network 520 may include wires that interconnect network components in addition to components for providing wireless communication with mobile devices. The components of the network 520 are implementation specific and may depend on the type of wireless network. There are many possibilities for the wireless network. The wireless network might for example be a GSM network.

In operation, the mobile device 500 communicates with the wireless network 520 over a wireless connection 540 between the mobile device 500 and the serving transceiver 521. The mobile station 500 is configured, through inclusion of the CRERLF module 510 which may be implemented in suitable hardware, firmware, and/or software stored in device memory 508, to perform any of the methods described above.

Figure 9:
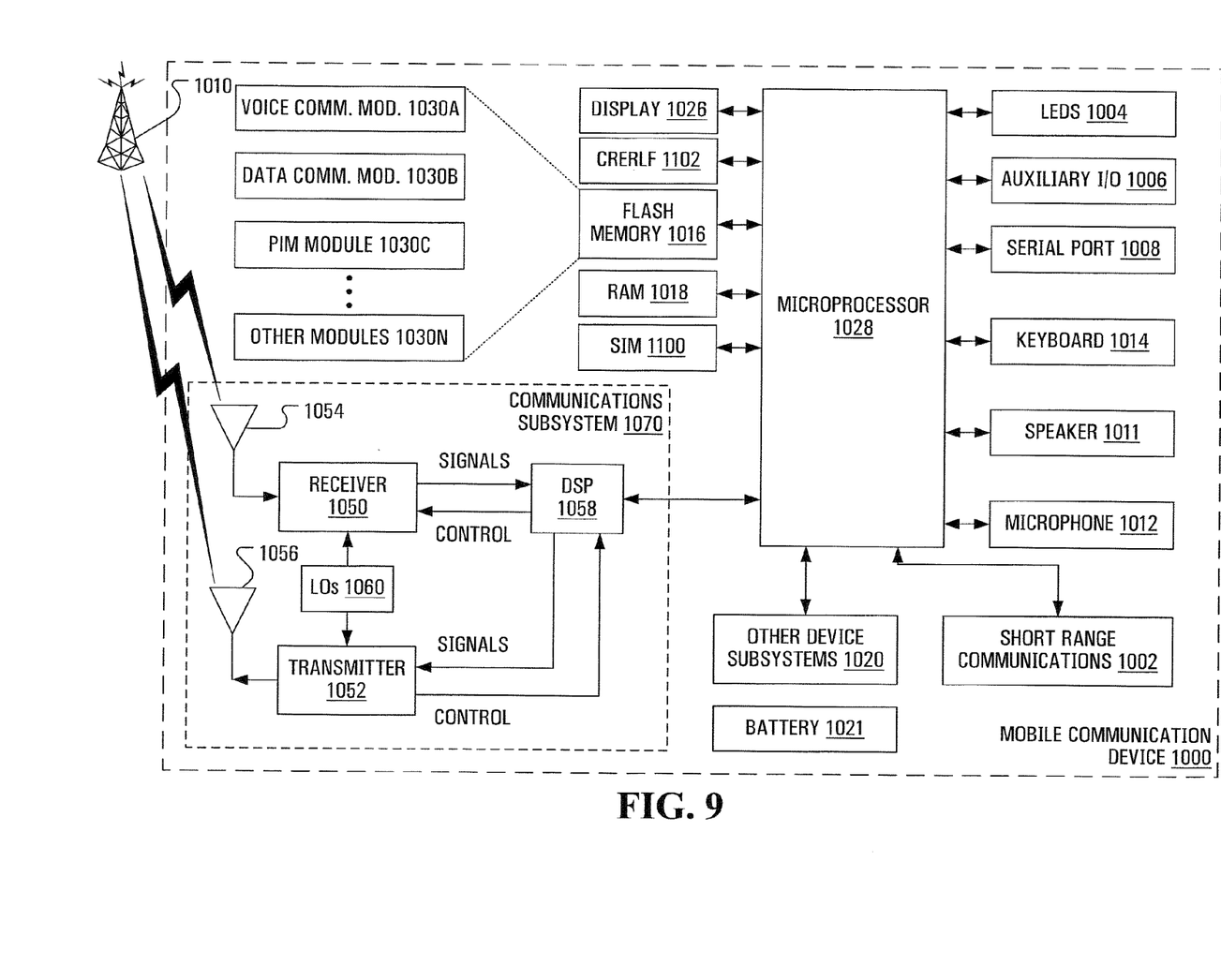
FIG. 9 is a detailed block diagram of a mobile station.

Referring now to FIG. 9, shown is a block diagram of another mobile station 1000 that may implement mobile station related methods described herein. It is to be understood that the mobile station 1000 is shown with very specific details for example purposes only. The mobile station 1000 has CRERLF 1102 which functions as per the CRERLF 510 of FIG. 8 described above.

A processing device (a microprocessor 1028) is shown schematically as coupled between a keyboard 1014 and a display 1026. The microprocessor 1028 controls operation of the display 1026, as well as overall operation of the mobile station 1000, in response to actuation of keys on the keyboard 1014 by a user.

The mobile station 1000 has a housing that may be elongated vertically, or may take on other sizes and shapes (including clamshell housing structures). The keyboard 1014 may include a mode selection key, or other hardware or software for switching between text entry and telephony entry.

In addition to the microprocessor 1028, other parts of the mobile station 1000 are shown schematically. These include: a communications subsystem 1070; a short-range communications subsystem 1002; the keyboard 1014 and the display 1026, along with other input/output devices including a set of LEDS 1004, a set of auxiliary I/O devices 1006, a serial port 1008, a speaker 1011 and a microphone 1012; as well as memory devices including a flash memory 1016 and a Random Access Memory (RAM) 1018; and various other device subsystems 1020. The mobile station 1000 may have a battery 1021 to power the active elements of the mobile station 1000. The mobile station 1000 is in some embodiments a two-way radio frequency (RF) communication device having voice and data communication capabilities. In addition, the mobile station 1000 in some embodiments has the capability to communicate with other computer systems via the Internet.

Operating system software executed by the microprocessor 1028 is in some embodiments stored in a persistent store, such as the flash memory 1016, but may be stored in other types of memory devices, such as a read only memory (ROM) or similar storage element. In addition, system software, specific device applications, or parts thereof, may be temporarily loaded into a volatile store, such as the RAM 1018. Communication signals received by the mobile station 1000 may also be stored to the RAM 1018.

The microprocessor 1028, in addition to its operating system functions, enables execution of software applications on the mobile station 1000. A predetermined set of software applications that control basic device operations, such as a voice communications module 1030A and a data communications module 1030B, may be installed on the mobile station 1000 during manufacture. In addition, a personal information manager (PIM) application module 1030C may also be installed on the mobile station 1000 during manufacture. The PIM application is in some embodiments capable of organizing and managing data items, such as e-mail, calendar events, voice mails, appointments, and task items. The PIM application is also in some embodiments capable of sending and receiving data items via a wireless network 1010. In some embodiments, the data items managed by the PIM application are seamlessly integrated, synchronized and updated via the wireless network 1010 with the device user's corresponding data items stored or associated with a host computer system. As well, additional software modules, illustrated as other software module 1030N, may be installed during manufacture. In addition, the microprocessor 1028 executes SRI updating and SRI reading functions.

Communication functions, including data and voice communications, are performed through the communication subsystem 1070, and possibly through the short-range communications subsystem 1002. The communication subsystem 1070 includes a receiver 1050, a transmitter 1052 and one or more antennas, illustrated as a receive antenna 1054 and a transmit antenna 1056. In addition, the communication subsystem 1070 also includes a processing module, such as a digital signal processor (DSP) 1058, and local oscillators (LOs) 1060. The specific design and implementation of the communication subsystem 1070 is dependent upon the communication network in which the mobile station 1000 is intended to operate. For example, the communication subsystem 1070 of the mobile station 1000 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile station 1000.

Network access may vary depending upon the type of communication system. For example, in the Mobitex™ and DataTAC™ networks, mobile stations are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile station 1000 may send and receive communication signals over the communication network 1010. Signals received from the communication network 1010 by the receive antenna 1054 are routed to the receiver 1050, which provides for signal amplification, frequency down conversion, filtering, channel selection, etc., and may also provide analog to digital conversion. Analog-to-digital conversion of the received signal allows the DSP 1058 to perform more complex communication functions, such as demodulation and decoding. In a similar manner, signals to be transmitted to the network 1010 are processed (e.g., modulated and encoded) by the DSP 1058 and are then provided to the transmitter 1052 for digital to analog conversion, frequency up conversion, filtering, amplification and transmission to the communication network 1010 (or networks) via the transmit antenna 1056.

In addition to processing communication signals, the DSP 1058 provides for control of the receiver 1050 and the transmitter 1052. For example, gains applied to communication signals in the receiver 1050 and the transmitter 1052 may be adaptively controlled through automatic gain control algorithms implemented in the DSP 1058.

In a data communication mode, a received signal, such as a text message or web page download, is processed by the communication subsystem 1070 and is input to the microprocessor 1028. The received signal is then further processed by the microprocessor 1028 for an output to the display 1026, or alternatively to some other auxiliary I/O devices 1006. A device user may also compose data items, such as e-mail messages, using the keyboard 1014 and/or some other auxiliary I/O device 1006, such as a touchpad, a rocker switch, a thumb-wheel, or some other type of input device. The composed data items may then be transmitted over the communication network 1010 via the communication subsystem 1070.

In a voice communication mode, overall operation of the device is substantially similar to the data communication mode, except that received signals are output to a speaker 1011, and signals for transmission are generated by a microphone 1012. Alternative voice or audio I/O subsystems, such as a voice message recording subsystem, may also be implemented on the mobile station 1000. In addition, the display 1016 may also be utilized in voice communication mode, for example, to display the identity of a calling party, the duration of a voice call, or other voice call related information.

The short-range communications subsystem 1002 enables communication between the mobile station 1000 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 7:
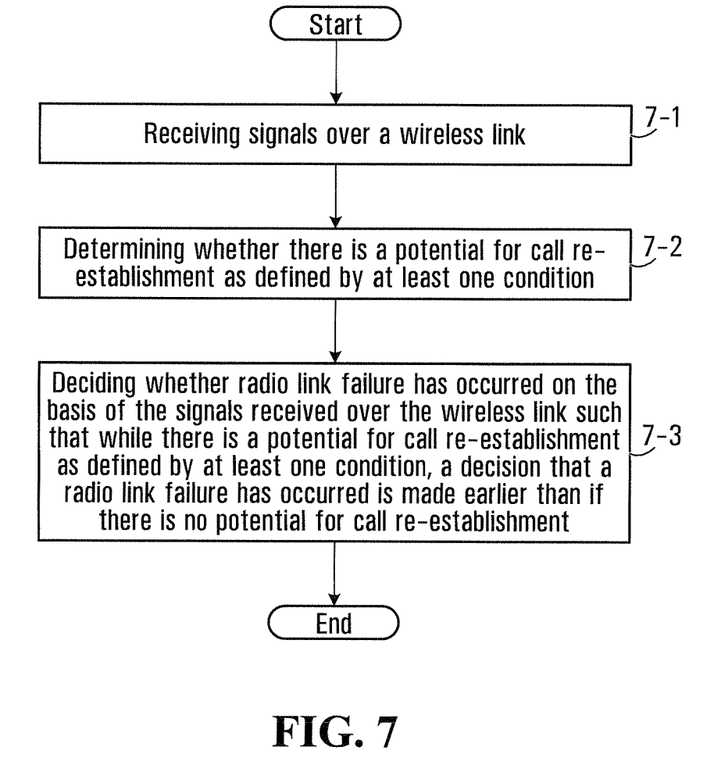
FIG. 7 is a flowchart of a method of deciding whether radio link failure has occurred.

In some embodiments, a mobile station, for example mobile station 500 of FIG. 8 or mobile station 1000 of FIG. 9 implements a method that will be described with reference to the flow chart of FIG. 7. The method begins at block 7-1 with receiving signals over a wireless link. The method continues at block 7-2 with determining whether there is a potential for call re-establishment as defined by at least one condition. The method continues at block 7-3 with deciding whether radio link failure has occurred on the basis of the signals received over the wireless link such that while there is a potential for call re-establishment as defined by at least one condition, a decision that a radio link failure has occurred is made earlier than if there is no potential for call re-establishment.

Numerous modifications and variations of the present invention are possible in light of the above teachings. It is therefore to be understood that within the scope of the appended claims, the invention may be practiced otherwise than as specifically described herein.

We claim:

1. A method in a mobile station, the method comprising:
receiving signals over a wireless link;
determining whether there is a potential for call re-establishment as defined by at least one condition;
deciding whether radio link failure has occurred on the basis of the signals received over the wireless link such that while there is a potential for call re-establishment as defined by the at least one condition, a decision that a radio link failure has occurred is made earlier than if there is no potential for call re-establishment.

2. The method of claim 1 wherein deciding whether radio link failure has occurred on the basis of the signals received over the wireless link comprises:
incrementing and decrementing a first counter on the basis of signals received over the wireless link;
incrementing and decrementing a second counter on the basis of signals received over the wireless link;
wherein incrementing and decrementing the first and second counter is such that the second counter will expire before the first counter.

3. The method of claim 1 wherein deciding whether radio link failure has occurred on the basis of the signals received over the wireless link comprises:
incrementing and decrementing a counter on the basis of signals received over the wireless link;
using a first expiry value for the counter while there is a potential for call re-establishment and using a second expiry value for the counter while there is no potential for call re-establishment.

4. The method of claim 2 further comprising initializing the second counter to a value that is a defined offset from an initialization value for the first counter.

5. The method of claim 2 further comprising initializing the second counter to a value that is a defined fraction of the initialization value for the first counter.

6. The method of claim 2 further comprising setting the second counter to a value that is one of a plurality of values, the one of the plurality of values being selected based on a current value of the first counter.

7. The method of claim 2 further comprising initializing the second counter to a value independent of an initialization value for the first counter.

8. The method of claim 2 wherein:
incrementing and decrementing a first counter on the basis of signals received over the wireless link comprises incrementing and decrementing the first counter as a function of success or failure of receipt of SACCH (Slow Associated Control Channel) blocks;
incrementing and decrementing a second counter on the basis of signals received over the wireless link comprises incrementing and decrementing the second counter as a function of success or failure of receipt of SACCH blocks.

9. The method of claim 2 further comprising:
enabling the second counter only while there is a potential for call re-establishment as defined by the at least one condition.

10. The method of claim 2 further comprising:
deciding radio link failure has occurred based on the second counter only while there is a potential for call re-establishment as defined by the at least one condition.

11. The method of claim 1 wherein the at least one condition includes that the mobile station is aware that there is at least one cell that has a call re-establishment feature enabled.

12. The method of claim 1 wherein the at least one condition includes that the mobile station has a set of cell system information required to perform call re-establishment.

13. The method of claim 1 wherein the at least one condition includes that voice quality is poor as defined by a metric.

14. The method of claim 1 further comprising:
generating an indication upon deciding that radio link failure has occurred that is the same irrespective of whether there is a potential for call re-establishment.

15. The method of claim 1 wherein:
the determination of radio link failure when the at least one condition is met results in either a call re-establishment attempt or termination of a connection without any call re-establishment attempt.

16. The method of claim 1 wherein:
the determination of radio link failure when the at least one condition is met results in either a call re-establishment attempt, but does not cause termination of a connection without any call re-establishment attempt.

17. The method of claim 1 further comprising:
initiating call re-establishment upon deciding that radio link failure has occurred.

18. A mobile station configured to implement the method of claim 1.

19. A computer readable medium having computer executable instructions stored thereon which when executed by a mobile station cause the mobile station to execute the method of claim 1.

* * * * *